Aug. 5, 1969  F. SANGIACOMO  3,460,160
CIRCULAR HOSIERY-MAKING APPARATUS
Filed Nov. 14, 1966  8 Sheets-Sheet 3
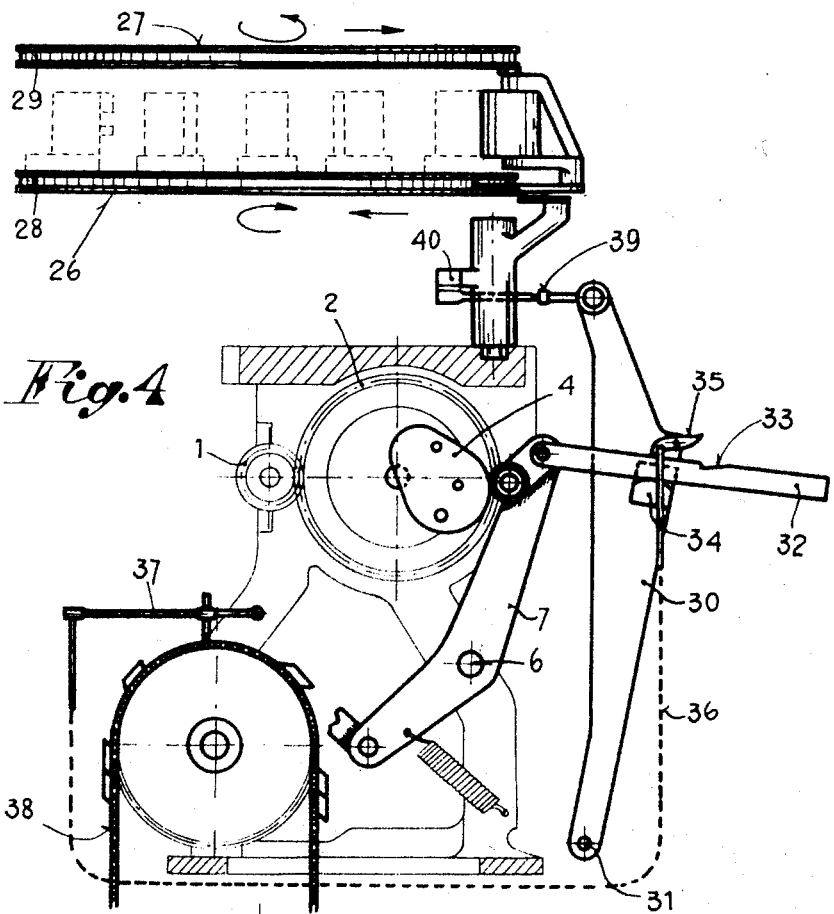
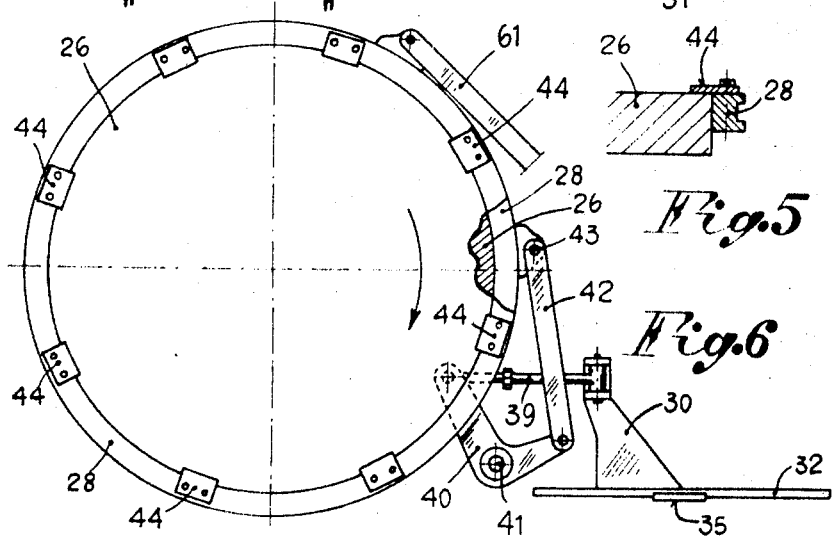
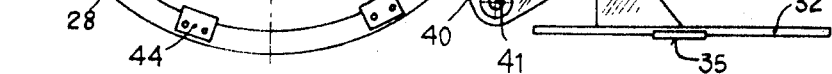

Aug. 5, 1969          F. SANGIACOMO          3,460,160
CIRCULAR HOSIERY-MAKING APPARATUS
Filed Nov. 14, 1966                    8 Sheets-Sheet 4
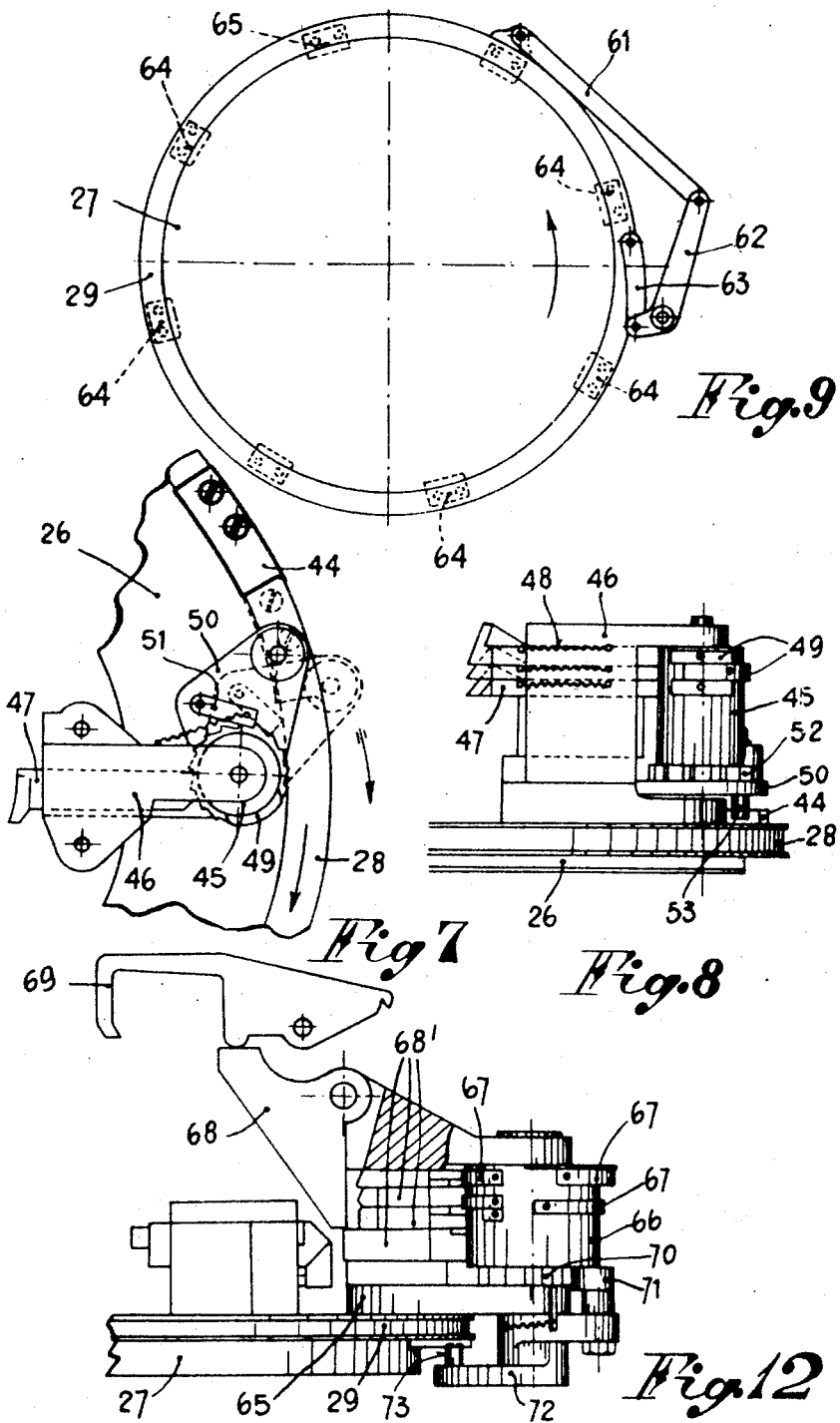

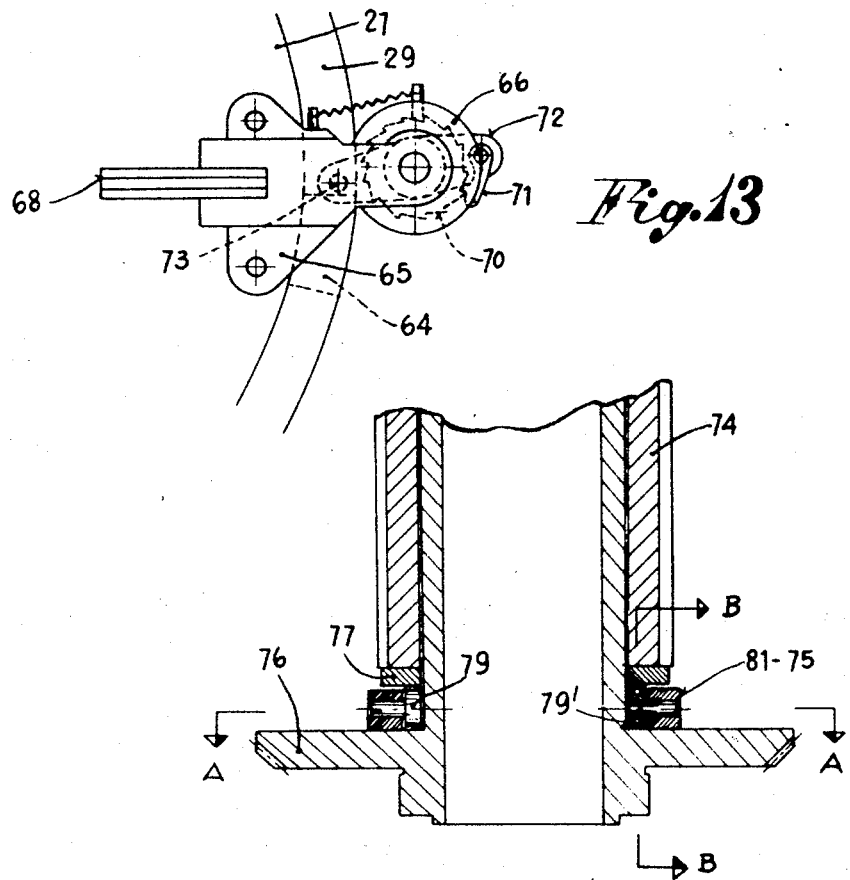
Fig. 13
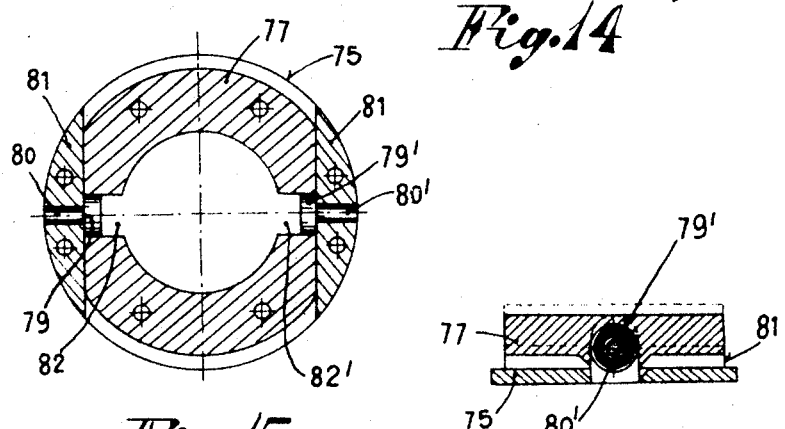
Fig. 14
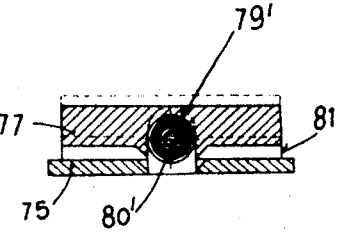
Fig. 15
Fig. 16

United States Patent Office 3,460,160
Patented Aug. 5, 1969

3,460,160
CIRCULAR HOSIERY-MAKING APPARATUS
Fulvio Sangiacomo, Via O. Villa 13, Brescia, Italy
Filed Nov. 14, 1966, Ser. No. 593,902
Claims priority, application Italy, Dec. 28, 1965, 749,995
Int. Cl. D04b 15/74, 15/78, 15/66
U.S. Cl. 66—50                                              11 Claims

ABSTRACT OF THE DISCLOSURE

A circular hosiery-making apparatus characterized by improvements in its cylinder-controlling means, in its chain-displacing pawl, in its platform arrangements, so that a greater variety of operations are possible with a lesser number of component parts.

---

The present invention relates to an improved apparatus, of the circular type, for manufacturing hosiery (stockings).

In the accompanying drawing:

FIGURE 4 is a side view of the means preset for the actuation of the small drums controlling the jacks' sliders and of the small drums controlling the thread-guides;

FIGURE 5 represents sectionally a particular detail of FIGURE 4;

FIGURE 6 is a top view of the control means for the small drums, with sliders for the displacement of the jacks;

FIGURES 7 and 8 are, respectively, a top view and a side view of one of the small drums of FIGURE 6, with sliders for the displacement of the jacks;

FIGURE 9 is a top view of the control means for the thread-guides, mounted on the ring of the upper platform of the apparatus;

FIGURES 12 and 13 show the group of one of the thread-guides actuated by the upper platform of the apparatus;

FIGURE 14 is a sectional view of the guiding unit for the cylinder of the apparatus during vertical displacements;

FIGURES 15 and 16 show in detail the sections of FIGURE 14 taken, respectively, in the direction of arrows A—A and B—B;

Figure 2:
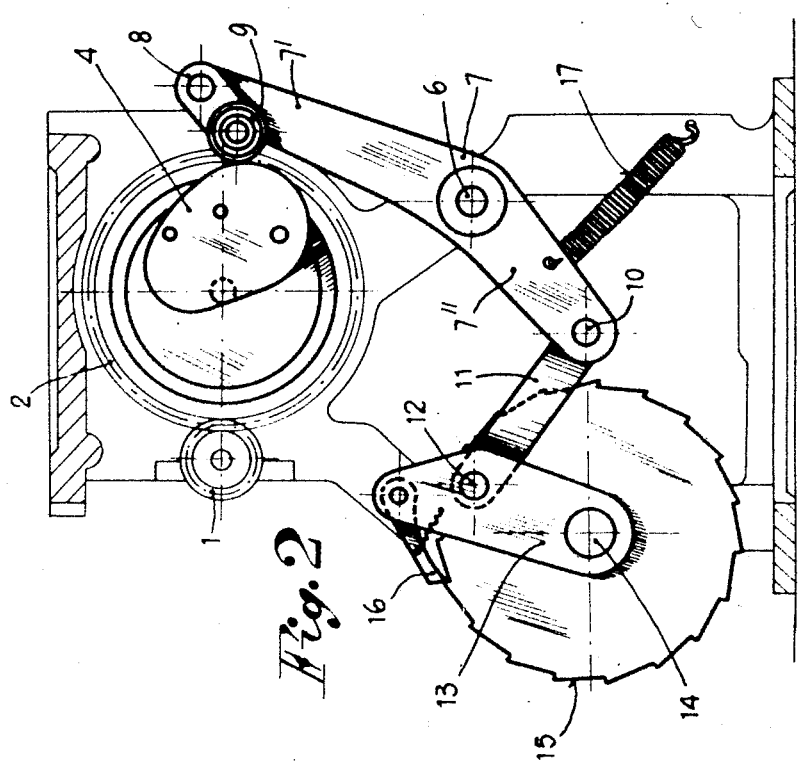
FIGURE 2 shows in greater detail the assemblied control unit for the drum of the apparatus.

The control unit for the drum of the apparatus (see FIGURE 2) consists of a pinion 1 which translates motion to a toothed wheel 2 keyed on the shaft from which originates the control of the cylinder of the apparatus. On the toothed wheel 2 there is fixed an eccentric cam 4 pivoting on a pin positioned on the housing or frame 6, and a balance-lever 7. The upper extension 7' of the lever 7 has fixed thereto an arm 8 with roll 9 for contact with the lateral surface of the cam 4. The lower extension 7" of the lever 7, instead, is connected by means of pin 10 to a tie-rod 11 which is in turn connected by means of pin 12 to a handled support 13. Support 13 is mounted in neutral (unengaged) on the shaft 14 which carries the ratchet wheel 15 for the control of the drum of the apparatus.

At the extremity of the handled support 13 mentioned hereabove, which effects alternate angular displacements, there is finally mounted a pawl 16 which acts upon the teeth of ratchet wheel 15. This, in turn, moves by tripping, so as to effect angular displacements in the same direction, that is in the direction corresponding to the motion of the drum.

The unit of the apparatus, now described, includes also a large spring 17 applied to the balance-lever 7, in order to ensure the contsant contact of roll 9 on the eccentric cam 4. This unit determines the angular displacements of the drum, which displacements are always proportional to the rotation of the cylinder of the apparatus and, consequently, are uniform in the most absolute sense. This is due to the transmission originated from the eccentric cam 4. This motion is impossible to obtain by means of conventional transmission means comprising handled mechanisms, as it is the case in known multiple-feeder machines. The motion obtainable by the apparatus of the invention offers the advantages of actuating the drum so as to make it rotate uniformly for two entire operative turns of the cylinder (instead of only one and one-half turns, as it is the case in conventional transmission means).

Figure 3:
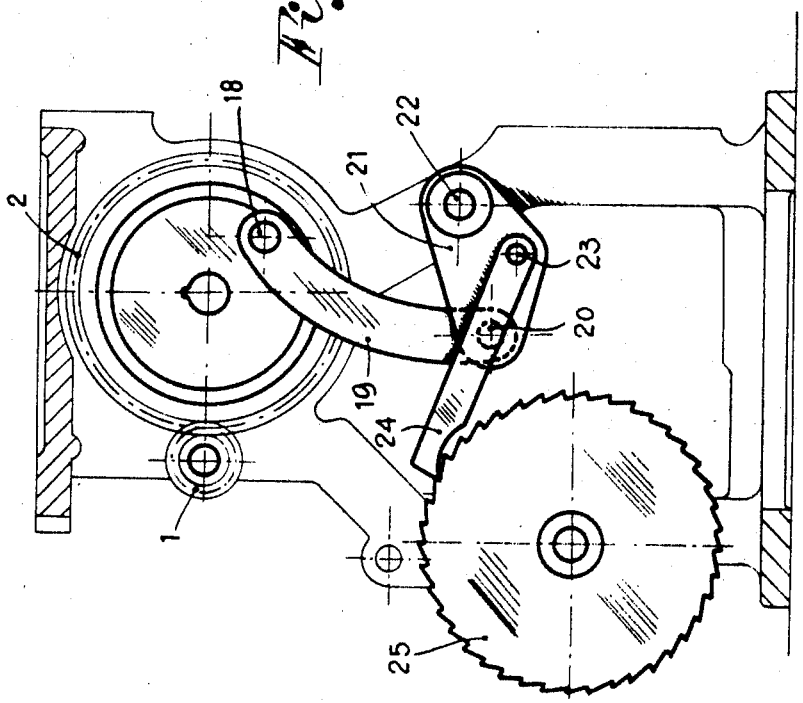
FIGURE 3 shows in detail the assembled control unit for the chain-displacement pawl.

The control for the displacement pawl of the chain mounted on the apparatus is obtained through the unit shown in FIGURE 3. For such control there is provided a pin 18 eccentrically mounted upon the toothed wheel 2 of motion-transmission to the cylinder, and to this pin 18 is connected a handle 19, the opposite extremity of which is, in turn, connected by means of a pin 20 to an oscillating lever 21; lever 21 is pivoting with pin 22 on the frame of the apparatus. Between the pivoting point of the lever 21 on the frame and the pivoting point of the handle 19 on the lever just mentioned, there is pivoting by means of pin 23 a small pawl 24, which effects a reciprocal or alternative movement on the teeth of the ratchet wheel 25 and, in so doing, determines the transmission of motion to the chain of the apparatus, which consequently moves angularly in a ratchet-like or trip-like fashion.

To control the displacements of the jacks, with which the cylinder of the apparatus is provided, if all of the various desired types of manufacture are to be obtained, the apparatus of the invention is so constructed as to eliminate the conventional and complicated returns of the jacks. This is achieved by employing a greater number of supplementary small drums (see FIGURES 6 and 7), so located as to perform all of the numerous functions desired.

The apparatus is provided with three fixed platforms, namely, a central one 26, an upper one 27, and a lower one 87, all of them concentrically positioned with respect to the cylinder. The central platform 26 is meant to operate in conjunction with the small drums (provided with slides) for the control of the jacks. Upon platforms 26 and 27 are mounted the rings 28 and 29, capable of effecting (upon actuation) reciprocal and angular displacements or movements. For this very purpose, there is provided a lever 30, pivoting at 31 in the back-side portion of the apparatus and actuated (see FIGURES 4 and 6)

by a tie-rod 32. Tie-rod 32 has a notch 33 therein and is guided on lever 30 by means of a dolly block 34, which in turn, is connected to the balance-lever 7 controlled by the eccentric cam 4 of the hereabove-mentioned control unit of the drum of the apparatus. By these arrangements, reciprocal or alternative, rectilinear movements or displacements are possible.

In the intermediate portion of the lever 30, there is pivoting a small pawl 35 which is connected by means of a metallic cable 36 to the lever 37. Lever 37 is actuated by the programming chain 38, said pawl 35, when lowered, becoming engaged in the notch 33 of the tie-rod 32. Tie-rod 32, in turn, upon displacement thereof, causes the lever 30 to effect an angular movement.

On the upper portion of the lever 30, there is pivotably connected the extremity of a tie-rod 39 which is, in turn, connected to a balance-lever 40. This lever 40 has a vertical pivot or pin 41 and is connected also (see FIGURE 6) to a tie-rod 42. Tie-rod 42 is connected by means of pin 43 to the mobile ring 28 of the rigid control platform 26 of the apparatus. On ring 28, which is suitably guided on the platform 26, there is mounted (and calculately located or positioned) a plurality of pushing means 44 (see FIGURE 6); the number of these means 44 corresponds to that of the small drums controlling the jacks of the machine. On each one of the small drums (see FIGURES 7 and 8, reference numeral 45) there is pivotably connected in the lower portion thereof a small plate 50 which has connected thereto a pawl 51 acting on the ratchet wheel 52 (fixed onto the respective drum). The small plate 50 has in its lower part and extruding downwardly a spoke 53 which is engaged by one of the pushers 44 carried by the ring 28. As stated hereabove, the small drums 45 are fixed to the rigid platform 26 and are provided with individual supports 46 for guiding the sliders 47 which are triggered by the springs 48 and actuated by the cams 49 purposely located on the drums.

Figure 10:
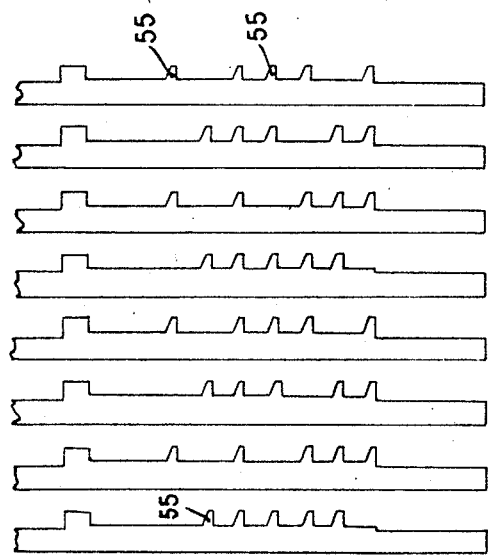
FIGURE 10 represents a series of jacks mounted on the machine of the invention.
Figure 11:
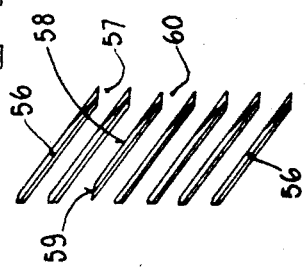
FIGURE 11 shows the frontal portion of the sliders for the jacks which are actuated by each of the small drums of FIGURE 8.

By virtue of the above-desired assembly, the jacks (shown in FIGURE 10 with their heels 55 so positioned that the needles of the apparatus can execute all of the desired operation, such as conventional mesh, unmeshed stitch, pocket-type heels, diagonal netting, crepe netting, etc.) are displaced vertically within the respective cylinder's guides by means of the sliders 47 which, frontally, are provided with inclined planes 56 having a chamfered extremity 57. One of said sliders 47 shows, instead, an inclined plane 58 having two terminal chamfers 59 and 60 (see FIGURE 11).

As it is the case with well-known drums, the sliders 47 are mounted on their respective supporters 46 and are positioned in such a manner that, as to number and location, they can perform all of the operations required.

Because of the transmission system of the apparatus of the invention for the control of the eight small drums mounted on the machine, these drums move in synchronism with the machine's cylinder and each one of the pushers 44, acting upon the respective spoke 53 of the plate 50 of the drum during the angular displacement of ring 28, causes the small drum itself to effect a similar angular movement by means of the pawl 51 which acts on the ratchet wheel 52. This angular displacement of the drum is limited by the angular displacement of the small plate 50 (FIGURES 7 and 8).

During the angular displacement of the ring 28, the elements 44 act upon spokes 53 of plate 50 of the drums, so as to abandon them while said elements 44 continue their displacement along with the ring which carries them. The spokes, just mentioned, remain engaged onto the ring's rim.

For the control of each group with thread-guides positioned on the fixed upper platform 27 (see FIGURES 4 and 6) there is provided, as mentioned hereabove, a ring 29 capable of effecting reciprocal or alternate angular displacements; the necessary motion is derived from the ring 28 of the central platform 26 by means of tie-rod 61 (see FIGURE 6), which determines the angular displacement of the balance-lever 62 (see FIGURE 9), appropriately and suitably pivotably connected. This lever 62 connects by means of lever 63 the above-mentioned tie-rod 61 to the ring 29. Because of this return action, the ring 29 is displaced in the opposite sense to the direction of rotation of ring 28 of the platform 26 (see FIGURE 6).

On ring 29 of the upper platform 27, which ring is suitably guided, there is mounted in a predetermined position a plurality of pushers 64, equal in number to the thread-guides. These pushers (see FIGURE 12) are each comprised of a base support 65 which carries pivotably connected a small drum 66 with cams 67. Each cam actuates the sliders 68' for the displacement of the levers 68 pivotably connected onto the base support and actuating the thread-guides 69. On the small drum there is mounted a ratchet wheel 70 actuated by a small pawl 71 pivoting on a small plate 72; on the diametrically opposite part of the pawl 71, the plate 72 carries a spoke 73 which is acted upon by one of the elements 64 of the ring 29.

Thanks to the angular displacement of ring 29, each one of the pushers 64, acting upon spokes 73 of plate 72 of the group of components of the machine hereabove described, causes the plate 72 to effect an angular displacement about its respective vertical pin. To this angular displacement corresponds the angular displacement of drums 66, determined by pawl 71 (which act upon ratchet wheel 70). Hence, the action of the cams of the small drum upon the sliders controlling the displacements of the thread-guides proper.

It should be noted that, while the small drum 66 effects its angular displacement, the cylinder of the machine effects two rotations.

Figure 1:
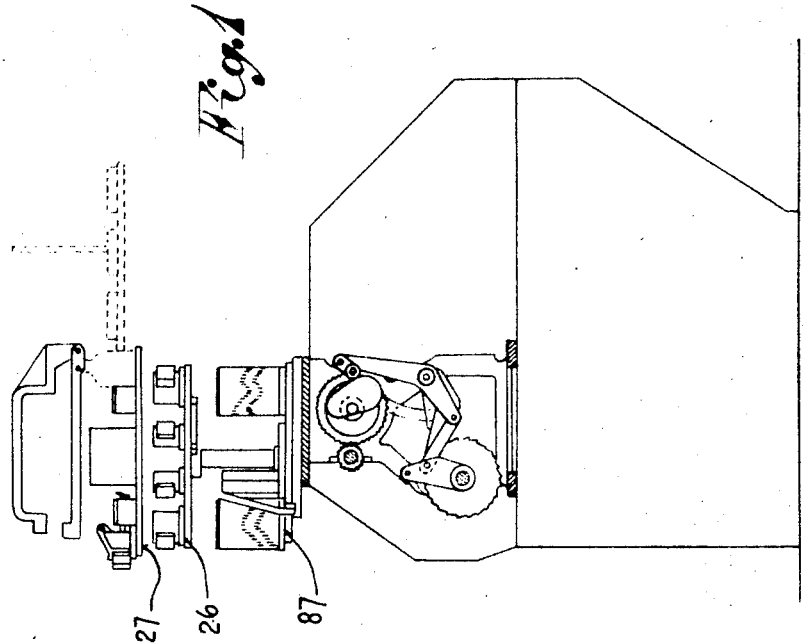
FIGURE 1 shows schematically the overall assembly of the apparatus of the invention.
Figure 19:
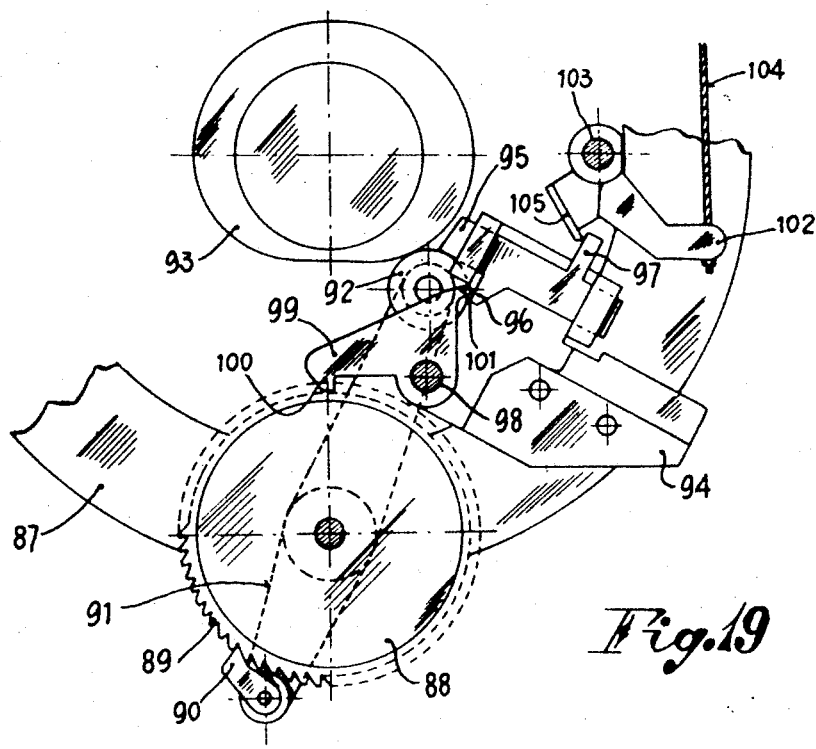
FIGURE 19 is a top view of the unit of the apparatus employed in the execution of the stocking's design and reinforcement.
Figure 20:
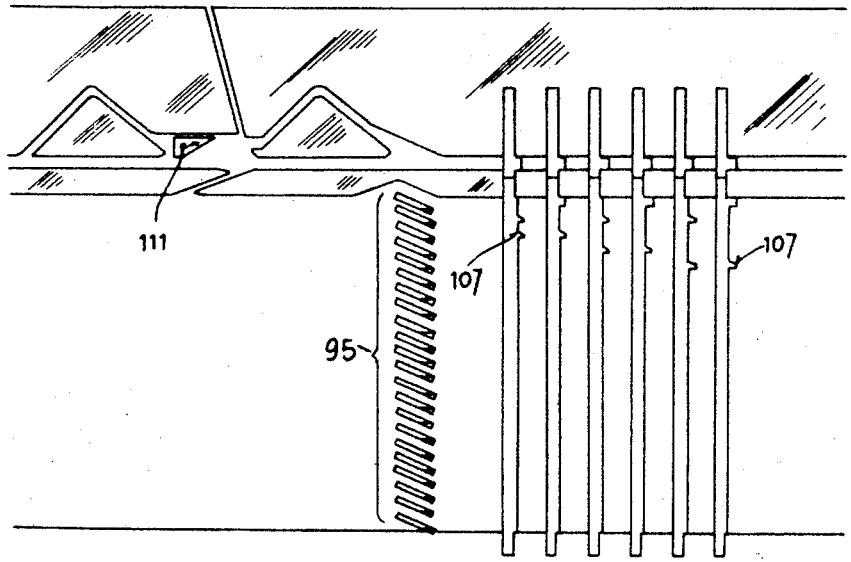
FIGURE 20 shows in combination the sliders of FIGURE 19 and the jacks actuated thereby.
Figure 21:
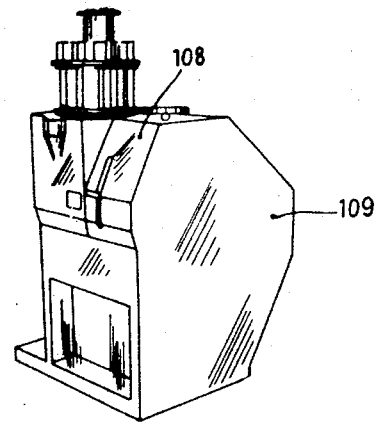
FIGURE 21 is a perspective view of an encased or housed apparatus of the invention.

On the lower platform 87 of the apparatus there is mounted, as shown in FIGURE 19, the group relative to the under-design and the leg-design, as well as the reinforcement of the stocking. This reinforcement is constituted substantially of two small drums 88 connected pivotably on the lower platform 87 (as shown in FIGURE 1 and, particularly in FIGURE 19, only one of said drums being illustrated). Each one of said drums 88, positioned diametrically opposite to each other, is provided with bars having conventional heel and carrying integrally thereto a ratchet wheel 89 connected to a pawl 90 located at the extremity of a balance-lever 91. The opposite extremity of this lever 91 is provided with a contact roll 92 which acts on the surface of a cam 93 fixedly connected to the cylinder-carrier. On the platform 87 mentioned hereabove there is fixed a vertical support 94 on which are provided the seats for twenty-two sliders 95, each seat being provided with a lateral front tappet 96 and a lateral back tappet 97. Tappet 96 is turned toward the small drum 88 and tappet 97 is turned toward the external part of the support 94. Between the vertical group of sliders and the small drum there are pivotably positioned by means of pin 98 (located on support 94) two less balance-levers 99 as there are sliders 95 and each of said levers has two terminal tappets 100 and 101 acting on the heels of the bars of the drum and acting also on tappet 96 of sliders 95.

By the above described arrangement, the sliders 95 are displaced by the levers 99, following the action thereupon of the heels of the bars of the drum during the drum's angular displacements. As stated, the drum moves because of the ratchet 89 controlled by the respective pawl 90 carried by lever 91.

The apparatus is also provided with a plurality of levers 102 pivotably connected to vertical pin 103 and actuated by fiexible tie-rods 104 (such as metallic cables). The extremity 105 of these levers acts upon tappets 97 of the sliders.

The operating principle of the design is based on cancellation; in other words, it is necessary to cancel the base or bottom in order to obtain the design. If the two drums 88 are not operative, the portion to be designed (under-design or leg-design) is automatically effected by alternately discarding the needle of the machine. In this case, one needle operates two threads and another needle operates one thread. To complete a design (which is a two-threaded one), it is therefore necessary to lift the needles which would have otherwise passed at mid-height (and consequently, with a single thread), so as to obtain the two-thread mesh.

The assembly of the apparatus of the invention allows the operator to double the efficiency of the machine, in that if there are available jacks (106) with twenty heels (107) it is tantamount as to have forty jacks, with the resultant savings in cylinder height.

Mechanically, the operating principle is as follows: on two successive feedings there is a fixed and predetermined selection, that is, all of the even needles are lifted more than the odd ones, and on two other successive feedings, the odd needles are lifted or raised more than the even ones. Therefore, if there were two heels (of jacks) adjacent and on the same horizontal row, so as to appear one under an even needle and one under an odd needle, and if by means of a slider both heels were to be raised or lifted, one could notice that during the feeding wherein the even needles are lifted, also an odd needle would be lifted. Similarly, during those feedings wherein the odd needles are lifted, also even needle would be raised. From this, it should be observed that one row of heels may be used for two functions and, therefore, it may double the efficiency of the machine.

To make the reinforcement of the stocking, the jacks lift only those needles which must be reinforced without employing the one-to-one relationship. The profile of the reinforcement is dependent width-wise on the jacks and lengthwise on the drums.

The so-called "cancellation" cams 111 are operative only when special knitting effects are desired such as, for example, pocket-type heels and the like. In this case, the sliders are operative.

The apparatus hereabove described shows the cylinder 74 as being guided so as to effect the necessary vertical displacements thereof on roll bearings or ball bearings, which perform the additional function of sliders of the cylinder itself.

By increasing the thread feedings there were noticed increases in the torque forces which affected the key of the cylinder-carrier; in view of the fact that the cylinder moves axially with respect to the cylinder-carrier, in order to overcome the friction met by the cylinder, there would be required traction springs. However, these, while being satisfactory for downwardly directed movements, require excessive efforts in the cast of upwardly directed movements.

This problem has now been resolved by the group of components shown in FIGURES 14–16 of the accompanying drawings. This group comprises a disc 75 fixedly connected to the crown of the cylinder-carrier 76; another disc 77 fixedly connected to the lower portion of the cylinder; and two rolls or bearings 79–79′ mounted on pins 80–80′ seated on suitably provided seats. These seats are located on each side of shoulders 81 of the disc 75. On the bearings 79–79′ is acting the disc 77, which, having openings 82–82′ therein, is slided by the bearings 79–79′. The bearings assume, therefore, the function of keys for the sliding of disc 77 and, consequently, of the cylinder itself. At the same time, however, the two bearings 79–79′ function as guiding means and as means for the vertical sliding of the cylinder, because the disc 77 is displaced vertically upon these bearings. The entire operation is effected with a negligible and almost imperceptible frictional effect.

Another characteristic of the apparatus of the invention is the independence of the support of the element which carries the needles from the support of the thread-guides.

Figure 17:
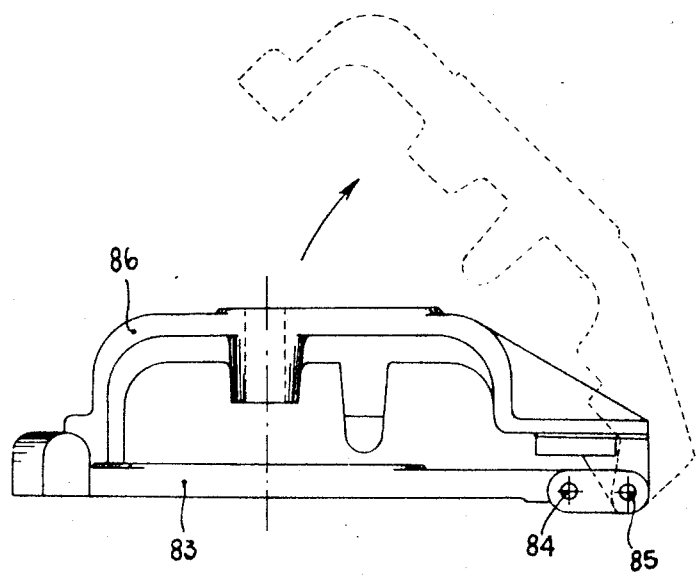
FIGURES 17 and 18 are a lateral view and a top view, respectively, of the assembly of the supports for the element carrying the hooks and for the element for the thread-guides.
Figure 18:
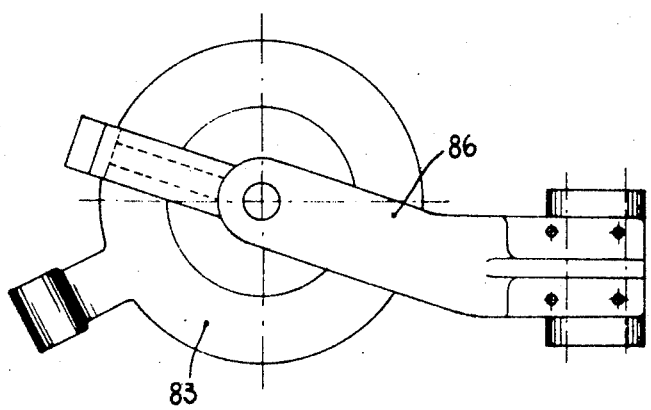

As shown in FIGURES 17 and 18 of the drawings, the support 83 of the thread-guides is connected by means of pin 84 on an H-shaped support of the machine (not shown), and to this support of the thread-guides there is also connected, by means of pin 85, the support 86 for the element carrying the needles.

By this particular arrangement, the two supports 83 and 86 can be lifted by angular displacement on pin 84 (of the former support) and the support of the element carrying the needles can be displaced, while on pin 85 remains unchanged the position of the support 83 for the thread-guides.

From the above-described arrangement, it can be readily seen that it is possible to inspect, while the machine is in operation, the manufacture of the meshing without excluding the possibility of effecting the desired corrections to the operation.

Figure 22:
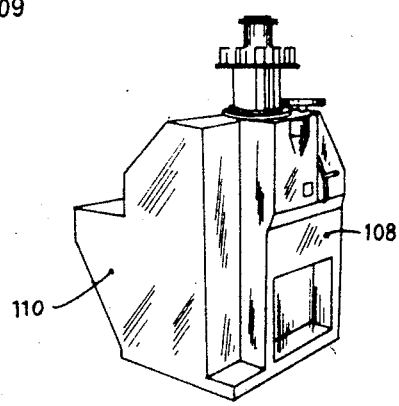
FIGURES 22–24 show in perspective a battery of machines of the invention.
Figure 23:
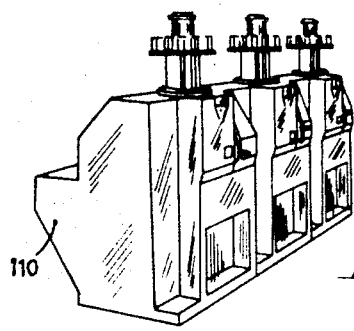
Figure 24:
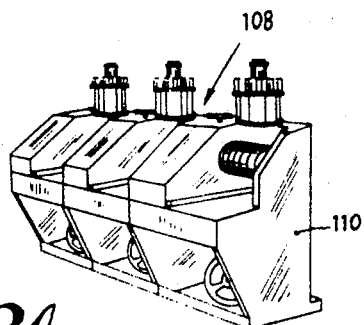

Finally, the apparatus of the invention is completed by a unique housing 108 (FIGURE 22) which covers and protects all of the mechanical components, the housing being considerably carefully built against possible-safety hazards. This is so, because no moving element, save the cylinder, is unprotected or positioned outside the housing. The housing has two lateral components 109 and 110, both completely flat, so as to allow the layout of a battery of machines (see FIGURES 23 and 24).

What is claimed is:

1. In a circular hosiery-making apparatus, the improvement in the cylinder-controlling means, which comprises: a balance-lever pivotably connected to the machine frame; a contact roll pivotably connected to the upper extremity of said balance-lever; an eccentrical cam having an outer surface continuously contacting said contact roll; a toothed wheel connected to said cam for transmission of motion to said cylinder; a support provided with a handle and connected through a tie-rod to the lower extremity of said balance-lever; a drum shaft connected to said support; and a pawl keyed to said shaft.

2. In the circular hosiery-making apparatus of claim 1 the improvement in the control of the chain-displacing pawl, which comprises: a handle eccentrically connected to said toothed wheel; an oscillating lever connected to the lower part of said handle and pivoting on the machine frame; and a pawl connected intermediate to said frame and acting on a ratchet wheel controlling the chain wheel of said machine.

3. A circular hosiery-making apparatus as claimed in claim 1, characterized by: a fixed central platform, concentrically positioned with respect to the cylinder; a mobile ring located on said central platform; a plurality of pusher fixedly connected to said ring; a plurality of drums mounted on said fixed central platform, said drums being angularly displaceable by said pushers, cams on said drums, sliders actuated by said cams, said sliders being arranged to displace the jacks of the machine; a system of levers and tie-rods connected to said ring; a control tie-rod connected to said system of levers and tie-rods and are also connected to the balance-lever of the cylinder-controlling means of the machine.

4. The apparatus of claim 3, wherein said control tie-rod is engaged to a pawl carried by the main vertical lever of said system of levers and tie-rods, said pawl being connected to a chain by means of a metallic cable, the said engagement determining the angular displacement of said main vertical lever.

5. The apparatus of claim 3, wherein said drums which are provided with slider-actuating cams, each has a lower plate pivotably connected to a pawl acting on the ratchet wheel of said drum, said plate being provided with a spoke which is actuated by one of said plurality of pushers.

6. The apparatus of claim 5, wherein said pawl, connected to said lower plate, and said lower plate are actuated upon, during their reciprocating movements, by springs.

7. The circular hosiery-making apparatus of claim 3 further characterized by: a fixed upper platform, concentrically positioned with respect to the cylinder and to said central platform; a ring mounted on said upper platform; a plurality of pushers fixedly connected to said ring to control the angular displacements of the drums which are provided with slide-actuating cams for the displacement of the thread-guides of the machine; a tie-rod connected on one hand to the ring of said central platform and on the other hand to two levers, said levers being also connected to the ring of said level platform.

8. The circular hosiery-making apparatus of claim 7, wherein said ring of said upper platform moves in a direction opposite to that of the ring of a lower and third platform of the machine.

9. The apparatus of claim 7, wherein said upper and said central platforms move in the same direction.

10. The apparatus of claim 7, wherein each of said drums which are provided with slider-actuating cams for the displacement of said thread-guides, has a plate, said plate carrying a spoke actuatable by one of said plurality of pushers; said plate displacing a pawl pivotably connected thereto so as to determine by means of a ratchet wheel the rotation of each of said drums.

11. The apparatus of claim 8, wherein to said lower platform are pivotably connected two drums, diametrically opposite to each other, each of said drums being controlled by a pawl acting upon the ratchet wheel thereof; said ratchet wheel being pivotably connected to one extremity of a balance-lever which is controlled by a cam fixedly connected to the cylinder-carrier of the apparatus; said drums having bars which act upon tappets suitably pivotable on a vertical pin, so as to control the displacement of a plurality of sliders guided and seated within a suitable vertical support; said sliders being optionally excludable from the operation of the machine by means of levers provided with flexible control means and acting upon the heels of the jacks of the apparatus.

References Cited

UNITED STATES PATENTS

| | | | |
|---|---|---|---|
| 149,813 | 4/1874 | Tuttle | 66—28 |
| 422,593 | 3/1890 | Huse et al. | 66—154 XR |
| 1,907,409 | 5/1933 | Sheppard | 66—154 |
| 2,382,750 | 8/1945 | St. Pierre et al. | 66—8 |
| 2,527,688 | 10/1950 | St. Pierre et al. | 66—28 |
| 2,552,742 | 5/1951 | Simmons et al. | 66—50 |
| 2,906,110 | 9/1959 | Bresani | 66—154 XR |
| 3,103,801 | 9/1963 | Azzolari | 66—50 |
| 3,122,008 | 2/1964 | Hanel et al. | 66—42 |
| 3,181,313 | 5/1965 | Crawford et al. | 66—42 |
| 3,296,836 | 1/1967 | Billi | 66—138 |

FOREIGN PATENTS

| | | |
|---|---|---|
| 612,165 | 11/1960 | Italy. |
| 319,109 | 9/1929 | Great Britain. |

RONALD FELDBAUM, Primary Examiner

U.S. Cl. X.R.

66—154